US012790014B1

(12) United States Patent
Yazici et al.

(10) Patent No.: US 12,790,014 B1
(45) Date of Patent: Nov. 10, 2026

(54) HYBRID ELECTRIC ENGINE OIL TANK WITH SURFACE HEAT EXCHANGE CAPABILITY

(71) Applicant: RTX CORPORATION, Farmington, CT (US)

(72) Inventors: Murat Yazici, Glastonbury, CT (US); Jeffrey T. Morton, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 19/223,577

(22) Filed: May 30, 2025

(51) Int. Cl.
*B64D 33/08* (2006.01)
*F01D 25/12* (2006.01)
*F01D 25/18* (2006.01)

(52) U.S. Cl.
CPC ............. *B64D 33/08* (2013.01); *F01D 25/12* (2013.01); *F01D 25/18* (2013.01); *F05D 2260/232* (2013.01); *F05D 2260/98* (2013.01)

(58) Field of Classification Search
CPC ...... F02C 7/14; F02C 7/12; F02C 7/32; F02C 7/18; F01D 25/18; F01D 25/12; F01D 9/065; F05D 2260/213; F05D 2220/76; F05D 2260/205; F05D 2260/98; F05D 2260/232; F05D 2220/32; F05D 2260/22141; F05D 2220/323; B64D 33/08
See application file for complete search history.

(56) References Cited

U.S. PATENT DOCUMENTS

| | | | | |
|---|---|---|---|---|
| 9,194,294 | B2 * | 11/2015 | Suciu | F01D 25/12 |
| 10,072,569 | B2 * | 9/2018 | Suciu | F02C 3/04 |
| 10,800,539 | B2 * | 10/2020 | Niergarth | B64D 27/33 |
| 2014/0010639 | A1 * | 1/2014 | Snape | F01D 25/18 415/177 |

FOREIGN PATENT DOCUMENTS

| | | | |
|---|---|---|---|
| CN | 107762634 | B | 9/2020 |
| CN | 118128643 | A | 6/2024 |
| FR | 3046200 | B1 | 12/2015 |

OTHER PUBLICATIONS

Machine Translation of CN107762634A [retrieved on Nov. 10, 2025]. Retrieved from: Espacenet. (Year: 2025).*
Machine Translation of CN118128643A [retrieved on Nov. 10, 2025]. Retrieved from: Espacenet. (Year: 2025).*

* cited by examiner

*Primary Examiner* — Eric J Zamora Alvarez
(74) *Attorney, Agent, or Firm* — Carlson, Gaskey & Olds, P.C.

(57) ABSTRACT

An aircraft propulsion system includes an electric machine generating thermal energy and a thermal management system configured to generate a lubricant flow that accepts the thermal energy generated from the electric machine. The thermal management system includes an oil tank with a heat transfer surface exposed to a cooling air flow for cooling stored lubricant.

22 Claims, 5 Drawing Sheets

HYBRID ELECTRIC ENGINE OIL TANK WITH SURFACE HEAT EXCHANGE CAPABILITY

TECHNICAL FIELD

The present disclosure relates generally to an oil tank for aircraft propulsion system including electric machines that generate heat and more particularly to an oil tank with convection heat exchange capability.

BACKGROUND

A turbine engine typically includes a fan section, a compressor section, a combustor section, and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. Electric motors and generators are integrated into turbine engines to improve engine efficiency and enable reductions in engine emissions. The addition and integration of electric systems and devices can increase loads on an engine thermal management system. Increasing a capacity of a thermal management system may enable further integration of electric machines and devices into aircraft propulsion systems.

SUMMARY

An aircraft propulsion system according to an exemplary embodiment of this disclosure includes, among other possible things, a propulsive fan that is configured to rotate about an engine axis and generate an airflow through a bypass flow path, a core engine that is configured to drive the propulsive fan, the core engine includes at least one spool, a nacelle that circumscribes the propulsive fan, the nacelle includes an exterior surface exposed to an ambient airflow and a radially outer surface of the bypass flow path, an inner fixed structure that defines a core compartment for the core engine, the inner fixed structure defines a radially inner surface of the bypass flow path, at least one electric machine coupled to the at least one spool, operation of the at least one electric machine generates thermal energy, a thermal management system that is configured to generate a lubricant flow that accepts the thermal energy generated from the at least one electric machine, and at least one oil tank that is configured to supply and store lubricant from the thermal management system, the oil tank includes a heat transfer surface that is exposed to a cooling air flow and mounted within at least one of the nacelle and the inner fixed structure.

In a further embodiment of the foregoing aircraft propulsion system, the core compartment is disposed between a firewall and a core nozzle and the oil tank is disposed within the core compartment with the heat transfer surface that defines a portion of the radially inner surface of the bypass flow path.

In a further embodiment of any of the foregoing aircraft propulsion systems, the core compartment includes a lower portion that is disposed below the engine axis and the at least one oil tank is disposed within the lower half.

In a further embodiment of any of the foregoing, the aircraft propulsion system further includes a static strut that extends radially through the bypass flow path and the at least one oil tank is disposed within the core compartment within a region that is defined between 5 and 90 degrees left or right of the static strut.

In a further embodiment of any of the foregoing aircraft propulsion systems, the nacelle defines a radial inner space and the at least one oil tank is disposed within the radially inner space and the heat transfer surface defines a portion of the exterior surface that is exposed to the ambient airflow.

In a further embodiment of any of the foregoing aircraft propulsion systems, the nacelle includes a lower portion that is disposed below the engine axis and the at least one oil tank is disposed within the lower portion and the heat transfer surface defines a portion of the exterior surface within the lower portion.

In a further embodiment of any of the foregoing aircraft propulsion systems, the at least one oil tank is disposed at a bottom center location of the nacelle.

In a further embodiment of any of the foregoing aircraft propulsion systems, the at least one oil tank includes a first oil tank that is disposed within the nacelle and a second oil tank that is disposed within the inner fixed structure.

In a further embodiment of any of the foregoing aircraft propulsion systems, the heat transfer surface further includes a plurality of heat transfer enhancement structures that extend from the heat transfer surface into the cooling airflow.

In a further embodiment of any of the foregoing aircraft propulsion systems, the plurality of heat transfer enhancement features includes rows of fins that are arranged in a direction common with a direction of the cooling air flow.

In a further embodiment of any of the foregoing aircraft propulsion systems, the core engine further includes a first spool and a second spool and the at least one electric machine includes a first motor generator that is coupled to the first spool, a second motor generator that is coupled to the second spool, and at least one controller that is programmed to control operation of the first motor generator and the second motor generator.

A thermal management system for an aircraft propulsion system according to another exemplary embodiment of this disclosure includes, among other possible things, a lubricant circuit for a lubricant flow that accepts thermal energy from at least one electric machine, a heat exchanger that is configured to transfer a portion of thermal energy absorbed by the lubricant flow from the at least one electric machine from the lubricant flow, and at least one oil tank that is mounted within one of a nacelle and an inner fixed structure and configured to store lubricant that is communicated to the at least one electric machine. The oil tank includes a heat transfer surface that is in thermal communication with a cooling air flow for cooling lubricant stored within the oil tank.

In a further embodiment of the foregoing thermal management system, the inner fixed structure defines a core compartment that is disposed between a firewall and a core nozzle of the aircraft propulsion system and the at least one oil tank is disposed within the core compartment with the heat transfer surface that defines a portion of the radially inner surface of a bypass flow path.

In a further embodiment of any of the foregoing thermal management systems, the nacelle defines a radial inner space and the at least one oil tank is disposed within the radially inner space and the heat transfer surface defines a portion of the exterior surface that is exposed to the ambient airflow.

In a further embodiment of any of the foregoing thermal management systems, the heat transfer surface further includes a plurality of heat transfer enhancement structures that extend from the heat transfer surface into the cooling airflow.

In a further embodiment of any of the foregoing thermal management systems, the aircraft propulsion system further includes a core engine that includes a first spool and a second spool and the at least one electric machine includes a first motor generator that is coupled to the first spool, a second motor generator that is coupled to the second spool, and at least one controller that is programmed to control operation of the first motor generator and the second motor generator.

In a further embodiment of any of the foregoing, the thermal management system further includes a main oil tank that communicates a lubricant flow to the at least one oil tank that includes the heat transfer surface.

In a further embodiment of any of the foregoing thermal management systems, the lubricant circuit is a closed circuit between the at least one electric machine and the at least one oil tank that includes the heat transfer surface.

A method of operating a thermal management system for an aircraft propulsion system according to another exemplary embodiment of this disclosure includes, among other possible things, absorbing thermal energy with a lubricant flow in thermal communication with at least one electric machine that is coupled to a core engine structure, receiving a portion of a heated lubricant flow within at least one oil tank that is mounted within one of a nacelle and an inner fixed structure and configured to supply and store lubricant, and cooling lubricant within the oil tank with a cooling flow that is communicated over a heat transfer surface of the oil tank. The heat transfer surface defines a portion of at least one of an exterior nacelle surface or a radially inner surface of a bypass flow path.

In a further embodiment of the foregoing, the method further includes circulating the lubricant flow within a closed lubricant circuit between the at least one electric machine and the at least one oil tank.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
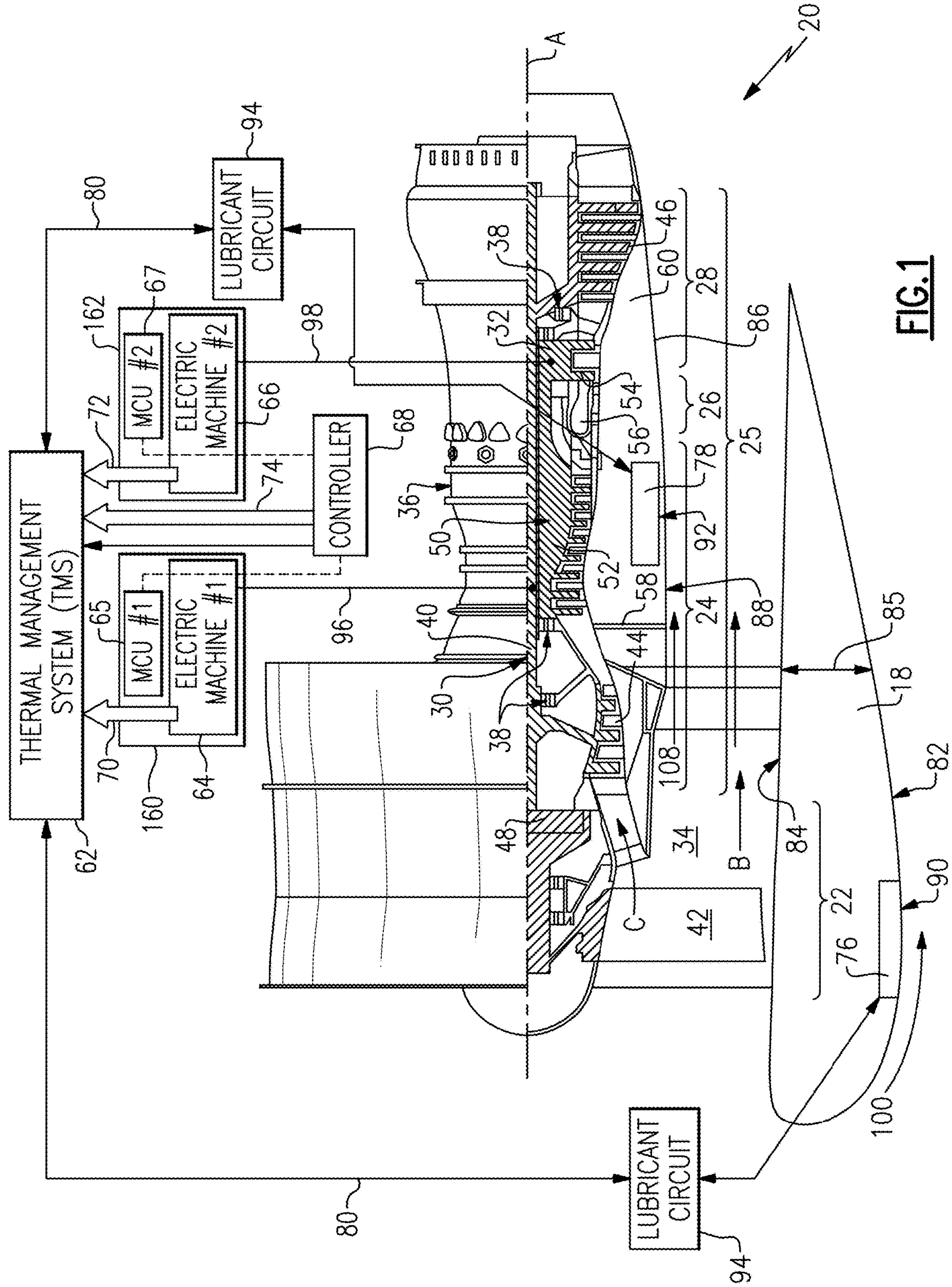
FIG. 1 is a schematic view of an example hybrid electric engine aircraft propulsion system.

FIG. 1 schematically illustrates an aircraft propulsion system 20 that includes integrated electric machine systems 160, 162. The integrated electric machine systems generate heat schematically indicated by arrows 70 and 72 and are controlled by a controller 68 that also generates heat that is indicated by arrow 74. A thermal management system (TMS) 62 circulates a lubricant flow 80 through a lubricant circuit 94 to provide lubrication and also to absorb heat from various systems in the engine and from the electric machine systems 160, 162.

The addition of the electric machine systems 160, 162 increases heat loads that are accommodated by the thermal management system 62. The example thermal management system 62 includes first and second oil tanks 76 and 78 that are in thermal communication with a cooling airflow to cool stored lubricant. The first and second oil tanks 76, 78 may be located within a core compartment 60, and/or within a nacelle 18. Cooling of lubricant within one or both of the first and second oil tanks 76, 78 increases the amount of heat that may be accommodated by the thermal management system 62 without additional dedicated heat exchangers.

The electric machine systems 160, 162 each includes a motor/generator 64, 66 and a corresponding motor control unit (MCU) 65, 67. The motor/generators 64, 66 and the motor control units 65, 67 each generate different heat loads that are accommodated by the thermal management system 62. The electric machine systems 160, 162 are shown schematically and may include other devices and assemblies that are required for operation and control. Moreover, although the MCUs 65, 67 are shown schematically with the corresponding motor/generator 64, 66, the MCUs may be located apart from the corresponding motor/generator 64, 66 or may be part of the controller 68.

In some embodiments, the MCU's 65, 67 and/or controller 68 may be configured to monitor a temperature of fluid in the oil tanks 76, 78, such as by receiving sensor data from temperature sensors known in the art, and control fluid through the circuit 80 based on the temperature of the fluid. For example, based on a determination that a temperature of the fluid in the first oil tank 76 is at or below a first (lower) threshold temperature, the MCU's 65, 67 and/or controller 68 may initiate pumping of fluid from the first oil tank 76 through the circuit 80, or vice versa with the second oil tank 78. For another example, based on a determination that the fluid temperature in the first oil tank 76 is at or above a second (upper) threshold temperature, the MCU's 65, 67 and/or controller 68 may be configured to not circulate fluid from the first oil tank 76, instead circulating only fluid from the second oil tank 78.

Moreover, although the controller 68 is schematically shown as being cooled by the thermal management system 62, the controller 68 may be cooled by other cooling systems and assemblies and remain with the contemplation of this disclosure. Cooling of the controller 68 is shown by way example of various heat loads that are accommodated by the thermal management system.

The propulsion system 20 includes a core engine 25 and is described by way of example as a two-spool turbofan that incorporates a propulsive fan section 22, a compressor section 24, a combustor section 26 and a turbine section 28. The fan section 22 may include a single-stage fan having a plurality of fan blades 42. The fan section 22 drives air along a bypass flow path B through a bypass passage 34, and also drives air along a core flow path C for compression and communication into the combustor section 26 then expansion through the turbine section 28.

A nacelle 18 and an inner fixed structure (IFS) 86 define outer and inner surfaces of the bypass passage 34. The nacelle 18 includes an exterior surface 82, a radially inner surface 84, and a radial space 85 therebetween. The core engine 25 is disposed within a core compartment 60 defined by the IFS 86. The IFS 86 includes surface 88 of the bypass passage 34. The IFS 86 is shown schematically and may include structures to support the core engine 25 and any accessory system structures disposed within the core compartment 60.

Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures and/or open rotor propulsion systems.

The exemplary core engine 25 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan section 22 through a speed change mechanism, which in the exemplary propulsion system 20 is illustrated as a geared architecture 48 to drive the fan section 22 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. Although this application discloses geared architecture 48, its teaching may benefit direct drive engines having no geared architecture.

The high speed spool 32 includes an outer shaft 50 that interconnects a second (or high) pressure compressor 52 and a second (or high) pressure turbine 54. A combustor 56 is arranged in the exemplary propulsion system 20 between the high pressure compressor 52 and the high pressure turbine 54. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The turbines 46, 54 rotationally drive the respective low speed spool 30 and high speed spool 32 in response to the expansion.

It will be appreciated that each of the positions of the fan section 22, compressor section 24, combustor section 26, turbine section 28, and fan drive gear system 48 may be varied. For example, gear system 48 may be located aft of the low pressure compressor 44, or aft of the combustor section 26 or even aft of turbine section 28, and the fan section 22 may be positioned forward or aft of the location of gear system 48.

The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan section 22.

The example propulsion system 20 incorporates the electric machine systems 160, 162 into the core engine 25 to extract or input power into the low spool 30 or the high spool 32. The motor/generators 64, 66 of each of the electric machine systems 160, 162 may also be utilized to transfer power between the low spool 30 and the high spool 32. The electric motor/generators 64, 66 may provide for the extraction of power or input power into a corresponding one of the low spool 30 and the high spool 32. The controller 68 is programmed to control operation of the electric motor/generators 64, 66 through the corresponding MCU 65, 67 as part of operation of the core engine 25.

The example controller 68 is a device and system for performing necessary computing or calculation operations of the electric machine systems 160, 162. The controller 68 may further comprise electrical components required for control of the electric machines that generate heat during operation. The controller 68 may be specially constructed for operation of the electric machine systems 160, 162, or it may comprise at least a general-purpose computer selectively activated or reconfigured by software instructions stored in a memory device. The MCUs 65, 67 may be part of the controller 68 or a separate device controlled by the example controller 68. The controller 68 may further be part of full authority digital engine control (FADEC) or an electronic engine controller (EEC). It should be appreciated, that the controller 68 and MCUs 65, 67 are shown by way of example and other control devices, systems and architectures could be utilized and are within the scope and contemplation of this disclosure.

Thermal energy generated by the electric machine systems 160, 162 is controlled by the thermal management system 62. The thermal management system 62 generates the lubricant flow 80 that accepts thermal energy from the electric machine systems 160, 162.

Figure 2:
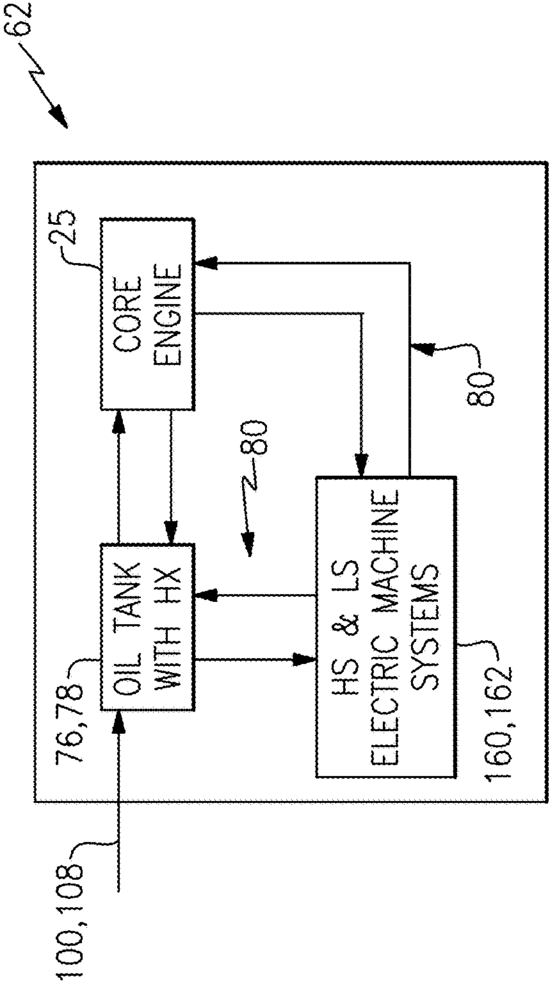
FIG. 2 is a simplified schematic view of an example thermal management system.

Referring to FIG. 2 with continued reference to FIG. 1, the example thermal management system 62 is schematically shown and provides a lubricant flow 80 to both the electric machine systems 160, 162 and to elements of the core engine 25. The lubricant flow 80 absorbs thermal energy and circulates back to at least one of the first and second oil tanks 76, 78. Each of the first and second oil tanks 76, 78 is configured to dissipate heat by providing thermal communication between lubricant and a cooling airflow 100, 108 in thermal communication with a heat exchange surface of a corresponding one of the first and second oil tanks 76, 78.

The term oil tank as used in this disclosure is directed toward a structure for the storage of substantial amount of lubricant (e.g., more than one (1) pint, one (1) quart, etc.). The storage of lubricant includes a substantial amount of static lubricant rather than a constantly flowing lubricant as may be provided in a heat exchanger within the lubricant circuit 94. Accordingly, the example oil tanks are containers where lubricant may be stored during engine off conditions and include a substantial quantity of static lubricant. Moreover, the example oil tanks may each include an opening to enable filling.

In one example embodiment, the first and second oil tanks 76, 78 store lubricant utilized to absorb heat from both the core engine 25 and the electric machine systems 160, 162. The features cooled in the core engine 25 may include the bearing systems 38, the geared architecture 48 as well as any other components that require cooling. Moreover, the lubricant flow 80 may also be utilized to absorb thermal energy from other systems within the aircraft including generator systems, battery system, avionics, and any other heat producing systems. The cooling airflow may be a bypass airflow 108 or an external ambient airflow 100 over the external surface 82 of the nacelle 18.

Figure 3:
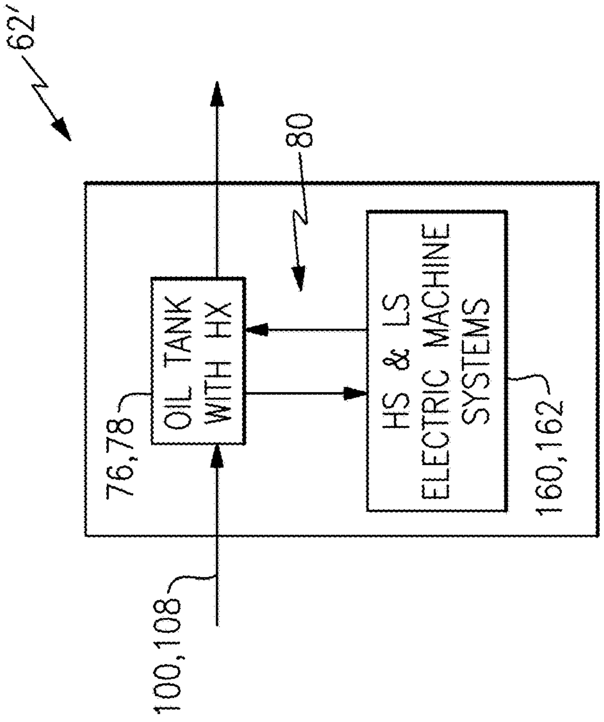
FIG. 3 is a simplified schematic view of another example thermal management system.

Referring to FIG. 3, another example thermal management system 62' embodiment may include the first and second oil tanks 76, 78 that are dedicated to providing the cooling lubricant flow 80 to only the electric machine systems 160, 162. The example thermal management system 62' is configured to operate independent of other systems that accommodate thermal energy produced by the core engine 25 and/or other aircraft heat producing systems and components.

Figure 4:
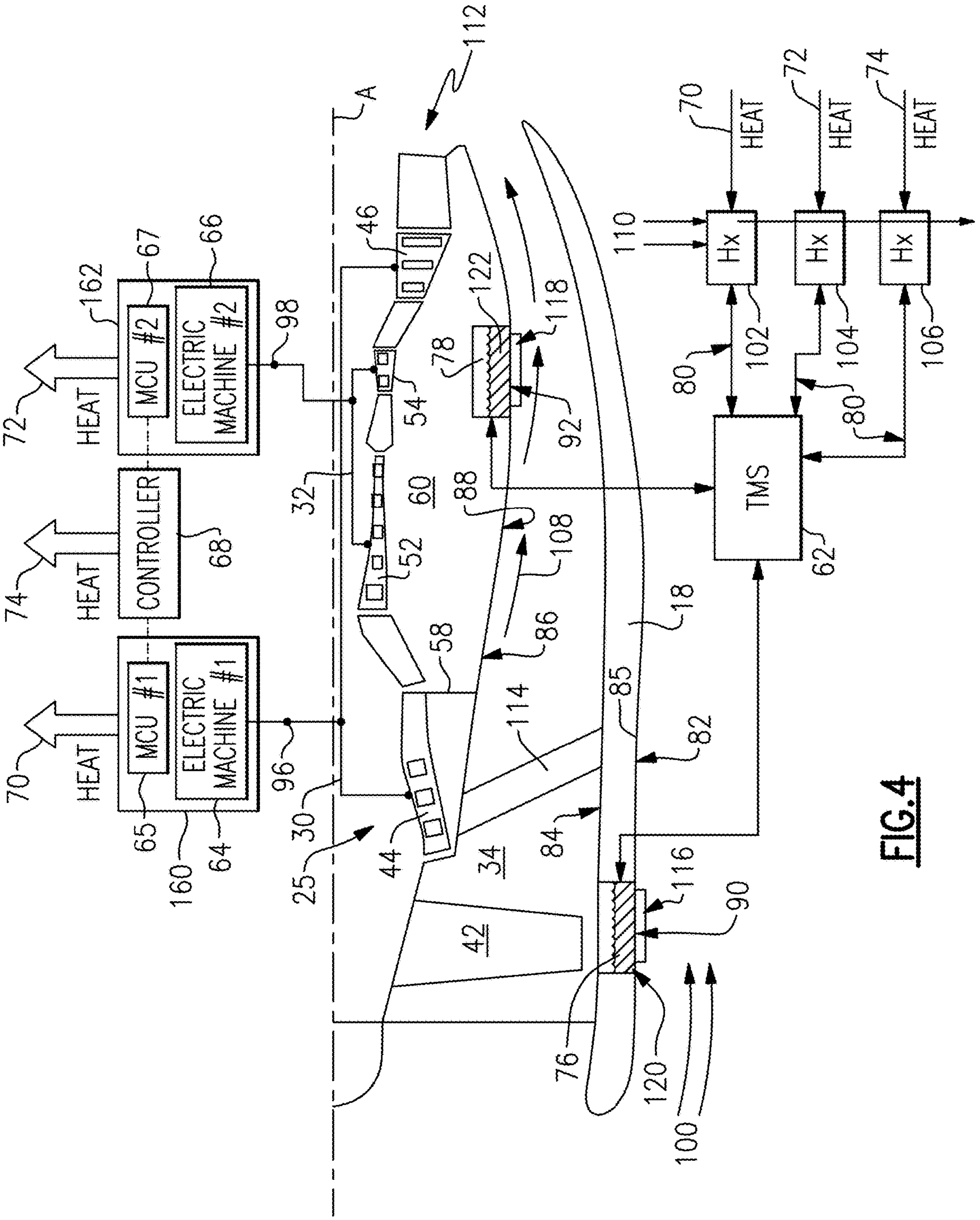
FIG. 4 is a simplified schematic view of the hybrid electric engine aircraft propulsion system.

Referring to FIG. 4 with continued reference to FIG. 1, the example propulsion system 20 is shown in a simplified schematic view with the first oil tank 76 disposed within the space 85 defined within the nacelle 18. The nacelle 18 defines the outer external surface 82 that is exposed to the ambient cooling air flow 100. The first oil tank 76 includes a heat transfer surface 90 that forms a portion of the external surface 82. The heat transfer surface 90 forms a portion of the external surface 82 by being substantially flush with the surrounding portions of the external surface 82.

The example electric machine systems 160, 162 are coupled to a corresponding one of the low spool 30 and the high spool 32. A first coupling 96 between the first electric machine 64 and the low spool 30 is schematically shown. A second coupling 98 between the second electric machine 66 and the high spool 32 is schematically shown. Each of the couplings 96, 98 may include a mechanical coupling through a gear system, clutch system or any other coupling system and remain within the contemplation of this disclosure.

The addition of the electric machine systems 160, 162 increases the amount of thermal energy generated and therefore an additional capacity for accepting and controlling thermal energy may be useful. In some engine architectures, adding additional heat exchangers, and/or increasing the capacity of existing heat exchangers can complicate construction and operation of the propulsion system 20. Accordingly, in the example propulsion system 20, the oil tanks 76, 78 are configured with a capacity to dissipate thermal energy in addition to the functioning as a lubricant storage location.

In one example embodiment, heat transfer enhancement features 116 are provided on the heat transfer surface 90 of the first oil tank 76. The heat transfer enhancement features 116 provide an increased surface area exposed to the ambient cooling air flow 100 that improves the thermal transfer capability through the heat transfer surface 90.

The nacelle 18 further includes a surface 84 of the bypass passage 34. The surface 88 of the IFS 86 forms the inner boundary of the bypass passage 34. The second oil tank 78 is disposed within the core compartment 60 within a space between the core engine 25 and the IFS 86 aft of a fan exit guide vane 114. The core compartment 60 is further defined axially between a firewall 58 and the core engine nozzle 112. In the example embodiment, the firewall 58 is disposed between the low pressure compressor 44 and the high pressure compressor 52. The firewall 58 may be arranged at other locations within the core compartment 60 and remain within the contemplation and scope of this disclosure.

A bypass airflow 108 is generated by the fan section 22 and communicated through the bypass passage 34, the fan exit guide vanes 114, and over the surface 88. The second oil tank 78 is disposed in an axial space between the firewall 58 and the core engine nozzle 112, proximate the inner radial surface 88.

The second oil tank 78 includes a heat transfer surface 92 that defines a portion of the surface 88 of the bypass passage 34. The heat transfer surface 92 forms a portion of the surface 88 by being flush with the surrounding portions of the IFS 86. The flush arrangement of the heat transfer surface 92 to the surface 88 eliminates or substantially reduces any disturbance to the bypass flow 108 through the bypass passage 34 while providing for the transfer of heat out of lubricant within the second oil tank 78.

In one example embodiment, heat transfer enhancement features in the form of fins 118 extend from the heat transfer surface 92 to increase the surface area where thermal transfer may occur. Although fins 118 are shown by way of example, other surface features that aid in the transfer of heat from the second oil tank 78 may also be used and are within the contemplation and scope of this disclosure.

Although the example first and second oil tanks 76, 78 are shown and described at specific locations within the outer nacelle 18 and the IFS 86, the first and second oil tanks 76, 78 may be located at other locations within the propulsion system 20 and remain within the contemplation and scope of this disclosure. Moreover, the first and second oil tanks 76, 78 may be utilized alone or in combination and remain within the scope and contemplation of this disclosure. Furthermore, additional oil tanks configured to cool lubricant with a cooling flow may be utilized and arranged throughout the propulsion system and remain with the contemplation of this disclosure.

The example TMS 62 may further include heat exchangers 102, 104, and 106 that accept some portion of heat energy 70, 72, and 74 from the lubricant flow 80 before the lubricant is communicated back to a corresponding one of the first and second oil tanks 76, 78. The heat exchangers 102, 104, and 106 are exposed to a cooling flow 110 to provide some portion of cooling. The cooling flow 110 may be through the bypass passage 34, outside of the propulsion system 20 or from other cooler flows, such as lubricant or fuel.

The additional heat energy dissipated by the first and second oil tanks 76, 78 may enable the size and capacity of the heat exchangers 102, 104 and 106 to be reduced. Alternatively, the additional cooling capacity added by the first and second oil tanks 76, 78 may reduce the amount of cooling flow 110 required to provide desired operational capabilities.

Each of the first and second oil tanks 76, 78 are arranged and orientated at locations such that stored oil 120, 122 is located against the corresponding heat transfer surface 90, 92. The location of each of the first and second oil tanks 76, 78 provides for gravity to automatically place the volume of lubricant 120, 122 within each of the first and second oil tanks 76, 78 directly into thermal contact with the corresponding heat transfer surface 90, 92. Direct contact improves thermal transfer of heat into the cooling flows.

Figure 5:
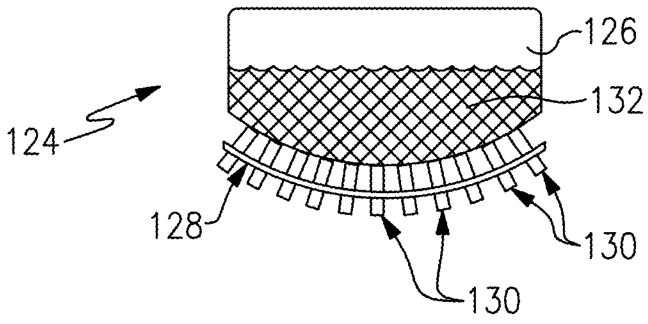
FIG. 5 is a cross-sectional schematic view of example oil tank.

Referring to FIG. 5, an example oil tank 124 is schematically shown and includes an irregular rectangular shaped tank 126 with a heat transfer surface 128. The heat transfer surface 128 is shaped to correspond with the mounting location of the oil tank 124. In one example embodiment, the heat transfer surface 128 is curved to match a curvature of the IFS 86 or nacelle 18. Although the example curvature is substantially uniform, the heat transfer surface 128 may be of an irregular shape and geometry to conform with the shape and geometry of the specific mounting location.

Fins 130 are shown extending outward from the heat transfer surface 128 to increase thermal transfer surface area. The fins 130 are one example of heat transfer feature that may be included to enhance heat dissipation.

Figure 6:
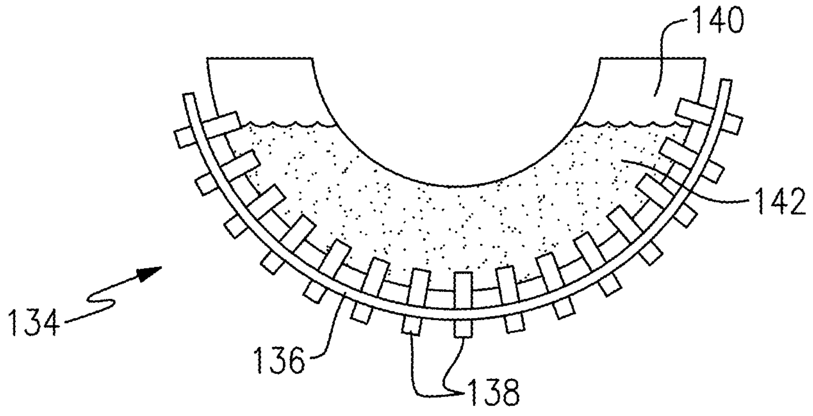
FIG. 6 is a cross-sectional schematic view of another example oil tank.

Referring FIG. 6, another example oil tank 134 is schematically shown and includes a tank 140 that is annularly shaped. The shape of the oil tank 134 is an example of different shapes and geometries that may be used to conform to the space and geometry of the mounting location. In this example, the tank 140 is partially annular and the heat transfer surface 136 is curved. The curved heat transfer surface 136 is an example of the different size and geometry of the oil tank 140 that may be used based on application specific conditions and available space. Fins 138 extend outward from the heat transfer surface 136. The fins 138 increase surface area exposed to the cooling flow to increase heat transfer efficiency.

The first and second oil tanks 76, 78 may be of either of the shapes described in FIGS. 5 and 6. Alternatively, the size and shape of each of the first and second oil tanks 76, 78 may be of other sizes and geometries to adapt to location specific space and desired oil storage capacities.

Referring to both FIGS. 5 and 6, each of the example oil tanks 124, 134 are arranged and mounted within the propulsion system 20 such that oil is in direct contact with the corresponding heat transfer surface 128, 136. In the illustrated embodiment, each of the heat transfer surfaces 128, 136 include fins 130 and 138 respectively. The oil volume 132 in the oil tank 124 is disposed against the heat transfer surface 128. The oil tank 124 is mounted such that any empty space is not adjacent or is spaced from the heat transfer surface 128. Similarly, in the oil tank 134 shown in FIG. 6. Even when an irregular shape is utilized, the oil tank 134 is mounted such that a substantial portion of the oil 142 is abutting a heat transfer surface 136.

Figure 7:
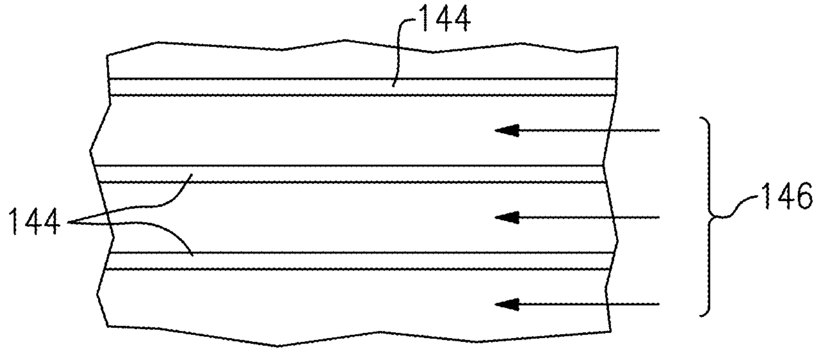
FIG. 7 is a schematic view of a heat transfer surface of an example oil tank.

Referring to FIG. 7 with continued reference to FIGS. 5 and 6, fins 144 are shown schematically. The fins 144 are disposed parallel to cooling air flow 146 (e.g., cooling airflows 100, 108). The parallel configuration limits disturbances in flow while still providing increased heat dissipation benefits.

The disclosed oil tanks are configured to dissipate between 5 kilowatts (KW) and 180 KW of heat from stored lubricant. The amount of heat dissipated through each oil tank will vary with the amount of heat present, the size of the tank and the size of the engine. The lubricant returned to and stored within the tank is hot and may eventually cool. However, the example tanks provide for faster dissipation of heat by the exposure to a cooler cooling airflow. Moreover, heat dissipation may be spread across several tanks arranged at different locations within the propulsion system 20. Although, a range of heat dissipation is disclosed by way of example, other ranges of possible heat dissipation are within the contemplation and scope of this disclosure.

Figure 8:
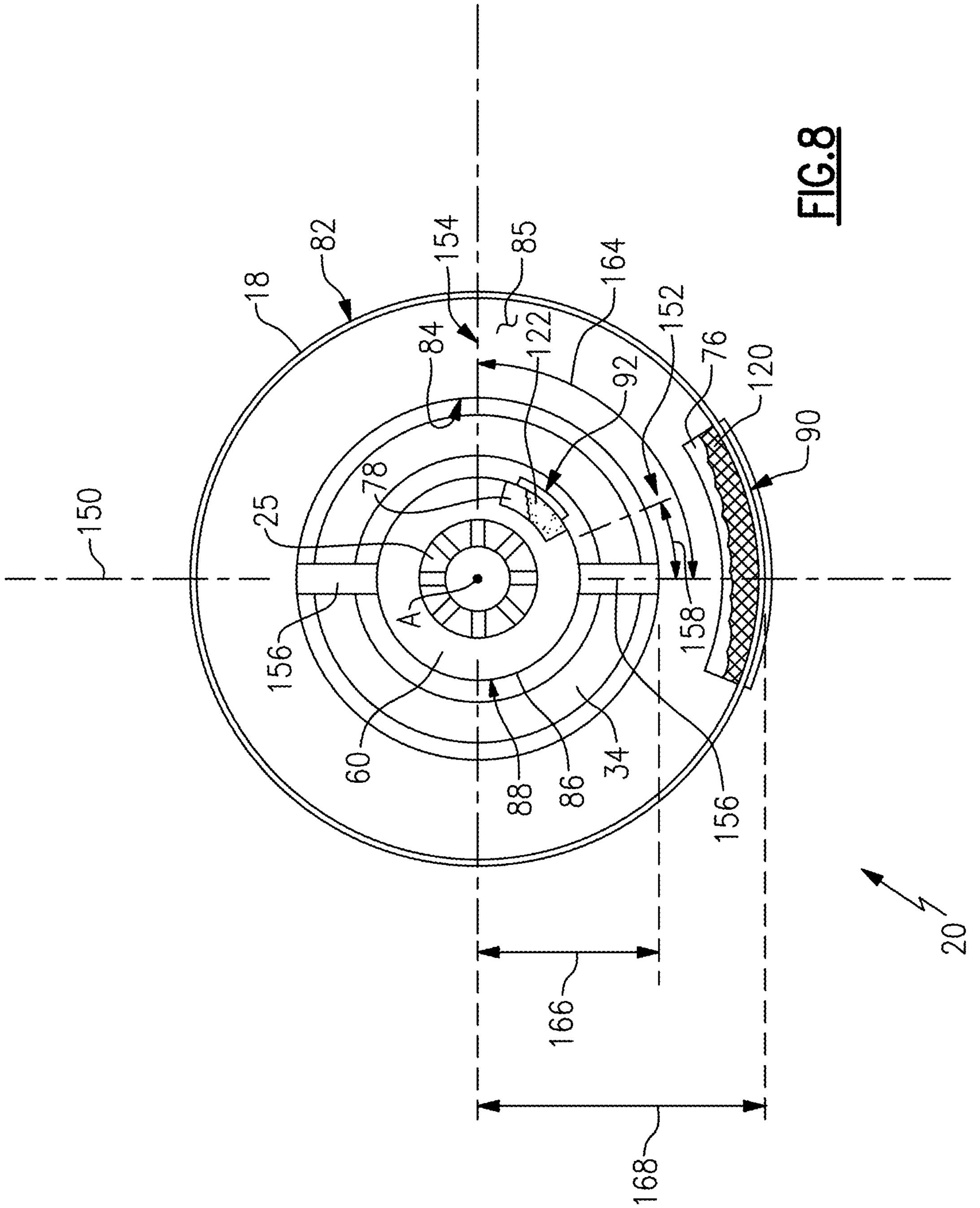
FIG. 8 is a schematic view of example oil tank with various mounting locations.

Referring to FIG. 8, a section of the propulsion system 20 is schematically shown looking along the engine central axis A. The core engine 25 is disposed about the central axis A and within the core compartment defined within the IFS 86. The IFS 86 includes the surface 88 that defines the inner radial surface of the bypass flow passage 34. A surface 84 of the bypass passage 34 is defined by the nacelle 18. The nacelle 18 includes a space between the surface 84 and the external surface 82.

A static strut 156 is disposed transverse to the central axis A. The static strut 156 is schematically shown and may be a support member for supporting the core engine, or a vane utilized to condition flow. The location of each of the first and second oil tanks 76, 78 is constrained by engine static structures such as the strut 156. Moreover, the first and second oil tanks 76, 78 are mounted such that the oil is directly against a heat transfer surface (e.g., surfaces 82, 88).

The central axis A is a reference for structures located above or below the central axis. In one example embodiment, the IFS 86 includes a lower portion located below the central axis A as indicated at 166. The second oil tank 78 located within the core compartment 60 is located within the lower portion 166 so that gravity will naturally place lubricant against the heat transfer surface 92.

During aircraft operation, the angle, direction, and orientation may change relative to the location of the second oil tank 78. Accordingly, the example lower portion 166 is described as a reference point and is applicable to the propulsion system 20 when the aircraft is in level flight or on the ground. Other orientations that may occur during flight operations may cause lubricant to momentarily not be entirely in contact with the heat transfer surface. However, the second oil tank 78 is configured to provide the desired contact with the heat transfer surface during a majority of aircraft operation.

In one example embodiment, the strut 156 prevents mounting of the second oil tank 78 at the center bottom location. Accordingly, the second oil tank 78 is mounted within an angular range from the centerline 150 of the propulsion system. The angular range includes a lower boundary 152 and an upper boundary 154. In one example embodiment, the lower boundary 152 is spaced at an angle 158 from the engine centerline 150. In one example embodiment, the angle 158 is greater than around 5 degrees from an engine centerline 150 and the upper boundary 154 is spaced apart an angle 164 from the engine centerline 150. In one example embodiment the angle 164 is around 90 degrees from the centerline 150. Other locations for the boundaries may be utilized and are within the contemplation of this disclosure.

The nacelle 18 has a lower portion schematically indicated at 168 that is disposed below the central axis A. The first oil tank 76 is located in nacelle 18 along the engine centerline 150. The bottom center location is possible because the strut 156 does not extend through the lower portion of the nacelle 18. Accordingly, the location of each of the first and second oil tanks 76, 78 are provided to maximize contact with heat transfer surfaces.

The disclosed oil tanks provide additional heat dissipation capacity while maintaining the primary function of storing lubricant for use throughout the engine. Moreover, the disclosed oil tanks enable increases in a capacity of an engine thermal management system to accommodate and control thermal energy without increases in heat exchanger size and/or number.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. An aircraft propulsion system comprising:

a propulsive fan configured to rotate about an engine axis and generate an airflow through a bypass flow path;

a core engine configured to drive the propulsive fan, the core engine comprising a first spool and a second spool;

a nacelle circumscribing the propulsive fan, the nacelle including an exterior surface exposed to an ambient airflow and a radially outer surface of the bypass flow path;

an inner fixed structure defining a core compartment for the core engine, wherein the inner fixed structure defines a radially inner surface of the bypass flow path;

at least one electric machine coupled to at least one of the first spool and the second spool, wherein operation of the at least one electric machine generates thermal energy, wherein the at least one electric machine comprises a first motor generator coupled to the first spool, a second motor generator coupled to the second spool, and at least one controller programmed to control operation of the first motor generator and the second motor generator;

a thermal management system configured to generate a lubricant flow that accepts the thermal energy generated from the at least one electric machine; and at least one oil tank configured to supply and store lubricant from the thermal management system, the at least one oil tank comprising a heat transfer surface that is exposed to a cooling air flow and mounted within at least one of the nacelle and the inner fixed structure.

2. The aircraft propulsion system as recited in claim 1, wherein the core compartment is disposed between a firewall and a core nozzle and the at least one oil tank is disposed within the core compartment with the heat transfer surface defining a portion of the radially inner surface of the bypass flow path.

3. The aircraft propulsion system as recited in claim 2, wherein the core compartment includes a lower portion disposed below the engine axis and the at least one oil tank is disposed within the lower portion.

4. The aircraft propulsion system as recited in claim 1, wherein the nacelle defines a radial inner space and the at least one oil tank is disposed within the radially inner space and the heat transfer surface defines a portion of the exterior surface exposed to the ambient airflow.

5. The aircraft propulsion system as recited in claim 4, wherein the nacelle includes a lower portion disposed below the engine axis and the at least one oil tank is disposed within the lower portion and the heat transfer surface defines the portion of the exterior surface within the lower portion.

6. The aircraft propulsion system as recited in claim 4, wherein the at least one oil tank is disposed at a bottom center location of the nacelle.

7. The aircraft propulsion system as recited in claim 1, wherein the at least one oil tank comprises a first oil tank disposed within the nacelle and a second oil tank disposed within the inner fixed structure.

8. The aircraft propulsion system as recited in claim 1, wherein the heat transfer surface further comprises a plurality of heat transfer enhancement structures that extend from the heat transfer surface into the cooling airflow.

9. The aircraft propulsion system as recited in claim 8, wherein the plurality of heat transfer enhancement structures comprises rows of fins that are arranged in a direction common with a direction of the cooling air flow.

10. The aircraft propulsion system as recited in claim 1, wherein the heat transfer surface is flush with surrounding portions of an external surface of at least one of the nacelle and the inner fixed structure.

11. An aircraft propulsion system comprising:

a propulsive fan configured to rotate about an engine axis and generate an airflow through a bypass flow path;

a core engine configured to drive the propulsive fan, the core engine including at least one spool;

a nacelle circumscribing the propulsive fan, the nacelle including an exterior surface exposed to an ambient airflow and a radially outer surface of the bypass flow path;

an inner fixed structure defining a core compartment for the core engine, wherein the inner fixed structure defines a radially inner surface of the bypass flow path, wherein the core compartment is disposed between a firewall and a core nozzle;

at least one electric machine coupled to the at least one spool, wherein operation of the at least one electric machine generates thermal energy;

a thermal management system configured to generate a lubricant flow that accepts the thermal energy generated from the at least one electric machine;

at least one oil tank disposed within the core compartment and configured to supply and store lubricant from the thermal management system, the at least one oil tank comprising a heat transfer surface that defines a portion of the radially inner surface of the bypass flow path that is exposed to a cooling air flow; and a static strut extending radially through the bypass flow path and the at least one oil tank is disposed within the core compartment within a region defined between 5 and 90 degrees left or right of the static strut.

12. A thermal management system for an aircraft propulsion system comprising:

a lubricant circuit for a lubricant flow that accepts thermal energy from at least one electric machine;

a heat exchanger configured to transfer a portion of thermal energy absorbed by the lubricant flow from the at least one electric machine from the lubricant flow;

at least one oil tank mounted within one of a nacelle and an inner fixed structure and configured to store lubricant communicated to the at least one electric machine, the at least one oil tank comprising a heat transfer surface in thermal communication with a cooling air flow for cooling lubricant stored within the oil tank; and a main oil tank communicating the lubricant flow to the at least one oil tank including the heat transfer surface.

13. The thermal management system as recited in claim 12, wherein the inner fixed structure defines a core compartment that is disposed between a firewall and a core nozzle of the aircraft propulsion system and the at least one oil tank is disposed within the core compartment with the heat transfer surface defining a portion of a radially inner surface of a bypass flow path.

14. The thermal management system as recited in claim 12, wherein the nacelle defines a radial inner space and the at least one oil tank is disposed within the radially inner space and the heat transfer surface defines a portion of an exterior surface exposed to an ambient airflow.

15. The thermal management system as recite in claim 12, wherein the heat transfer surface further comprises a plurality heat transfer enhancement structures that extend from the heat transfer surface into the cooling air flow.

16. The thermal management system as recited in claim 12, wherein the aircraft propulsion system further comprises a core engine that includes a first spool and a second spool and the at least one electric machine comprises a first motor generator coupled to the first spool, a second motor generator coupled to the second spool, and at least one controller programmed to control operation of the first motor generator and the second motor generator.

17. The thermal management system as recited in claim 12, wherein the lubricant circuit is a closed circuit between the at least one electric machine and the at least one oil tank including the heat transfer surface.

18. The thermal management system as recited in claim 12, wherein the heat transfer surface is flush with surrounding portions of an external surface of the one of the nacelle and the inner fixed structure.

19. An aircraft propulsion system comprising:

a propulsive fan configured to rotate about an engine axis and generate an airflow through a bypass flow path;

a core engine configured to drive the propulsive fan, the core engine including at least one spool;

a lubricant circuit for a lubricant flow that accepts thermal energy from at least one electric machine;

a heat exchanger configured to transfer a portion of thermal energy absorbed by the lubricant flow from the at least one electric machine from the lubricant flow;

at least one oil tank mounted within one of a nacelle and an inner fixed structure and configured to store lubricant communicated to the at least one electric machine, the at least one oil tank comprising a heat transfer surface in thermal communication with a cooling air flow for cooling lubricant stored within the at least one oil tank; and a main oil tank communicating the lubricant flow to the at least one oil tank including the heat transfer surface.

20. The aircraft propulsion system as recited in claim 19, wherein the core engine further comprises a first spool and a second spool and the at least one electric machine comprises a first motor generator coupled to the first spool, a second motor generator coupled to the second spool, and at least one controller programmed to control operation of the first motor generator and the second motor generator.

21. The aircraft propulsion system as recited in claim 19, further comprising an inner fixed structure defining a core compartment, wherein the core compartment is disposed between a firewall and a core nozzle and the at least one oil tank is disposed within the core compartment with the heat transfer surface defining a portion of a radially inner surface of the bypass flow path and a static strut extends radially through the bypass flow path and the at least one oil tank is disposed within the core compartment within a region defined between 5 and 90 degrees left or right of the static strut.

22. The aircraft propulsion system as recited in claim 19, wherein the heat transfer surface is flush with surrounding portions of an external surface of the one of the nacelle and the inner fixed structure.

* * * * *